(12) United States Patent
Folco et al.

(10) Patent No.: US 9,170,976 B2
(45) Date of Patent: Oct. 27, 2015

(54) NETWORK EFFICIENCY AND POWER SAVINGS

(71) Applicant: International Business Machines Corporation, Armonk, NY (US)

(72) Inventors: Rafael C. S. Folco, Santa Barbara d'Oeste (BR); Breno H. Leitao, Campinas (BR); Tiago N. D. Santos, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 13/733,542

(22) Filed: Jan. 3, 2013

(65) Prior Publication Data

US 2014/0189173 A1     Jul. 3, 2014

(51) Int. Cl.
*G06F 1/32* (2006.01)
*G06F 13/42* (2006.01)

(52) U.S. Cl.
CPC .......... *G06F 13/4295* (2013.01); *G06F 1/3209* (2013.01); *G06F 1/3287* (2013.01); *Y02B 60/1228* (2013.01); *Y02B 60/1235* (2013.01)

(58) Field of Classification Search
CPC ... G06F 1/3206; G06F 1/3209; G06F 1/3228; G06F 1/3287; Y02B 60/40; Y02B 60/1228
USPC ................................ 713/320, 322, 323, 324
See application file for complete search history.

(56) References Cited

U.S. PATENT DOCUMENTS

| 6,134,678 A | 10/2000 | Mahalingam et al. |
| 7,907,528 B2 | 3/2011 | Liu et al. |

(Continued)

FOREIGN PATENT DOCUMENTS

| CN | 101350818 A | 1/2009 |
| CN | 101383732 A | 3/2009 |

(Continued)

OTHER PUBLICATIONS

PCT International Search Report (PCT/ISA/210) dated Apr. 3, 2014, PCT Notification of Transmittal of the International Search Report and the Written Opinion of the International Searching Authority or the Declaration (PCT/ISA/220), and the PCT Written Opinion of the International Searching Authority (PCT/ISA/237), International Application No. PCT/CN2014/070008, 11 pages.

(Continued)

*Primary Examiner* — Glenn A Auve
(74) *Attorney, Agent, or Firm* — Francis Lammes; Stephen J. Walder, Jr.; Parashas Kalaitzis

(57) ABSTRACT

A mechanism is provided for resource management. A first network interface card in a set of network interface cards receives network data from one or more servers in a set of servers. Responsive to the first network interface card determining that a first threshold has been met indicating that an overload condition is imminent in the first network interface card, the first network interface card sends a resume signal to a second network interface card in the set of network interface cards. Responsive to the first network interface card determining that a second threshold is being met indicating that the overload condition has been met in the first network interface card, the first network interface card delegates the network data that caused the overload condition to be met to the second interface card.

22 Claims, 8 Drawing Sheets

(56) References Cited

U.S. PATENT DOCUMENTS

| | | | |
|---|---|---|---|
| 7,934,033 | B2 | 4/2011 | Malwankar et al. |
| 7,995,465 | B2 | 8/2011 | Abdulla et al. |
| 2008/0002714 | A1 | 1/2008 | Belgaied et al. |
| 2008/0304519 | A1 | 12/2008 | Koenen et al. |
| 2009/0276773 | A1 | 11/2009 | Brown et al. |
| 2010/0082874 | A1 | 4/2010 | Baba et al. |
| 2010/0115174 | A1 | 5/2010 | Akyol et al. |
| 2011/0029695 | A1 | 2/2011 | Kishore et al. |
| 2011/0055433 | A1 | 3/2011 | Kishore et al. |
| 2011/0119423 | A1 | 5/2011 | Kishore et al. |

FOREIGN PATENT DOCUMENTS

| | | |
|---|---|---|
| CN | 101765176 A | 6/2010 |
| JP | 2010-39729 A | 2/2010 |

OTHER PUBLICATIONS

"PC/1520 Implementation Guide", Texas Instruments, Application Report, SCPA033, Section 6.3, http://www.ti.com/lit/an/scpa033/scpa033.pdf, Oct. 2002, p. 8.

Sabhanatarajan, Karthikeyan et al., "Smart-NICs: Power Proxying for Reduced Power Consumption in Network Edge Devices", Symposium on VLSI, 2008 (ISVLSI'08), IEEE, Apr. 7-9, 2008, 6 pages.

Sohan, Ripduman et al., "Characterizing 10 Gbps Network Interface Energy Consumption", University of Cambridge, Technical Report No. 784, http://www.cl.cam.ac.uk/~acr31/pubs/sohan-10gbpower.pdf, Jul. 2010, 10 pages.

Suzuki, J. et al., "Multi-root Share of Single-Root I/O Virtualization (SR-IOV) Compliant PCI Express Device", 2010 IEEE 18th Annual Symposium on High Performance Interconnects (HOTI), Mountain View, California, Aug. 18-20, 2010, pp. 25-31, Abstract only, 1 page.

NETWORK EFFICIENCY AND POWER SAVINGS

BACKGROUND

The present application relates generally to an improved data processing apparatus and method and more specifically to mechanisms for improving network efficiency and power savings.

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

SUMMARY

In one illustrative embodiment, a method, in a data processing system, is provided for resource management. The illustrative embodiment receives, by a first network interface card in a set of network interface cards, network data from one or more servers in a set of servers. The illustrative embodiment sends, by the first network interface card, a resume signal to a second network interface card in the set of network interface cards in response to the first network interface card determining that a first threshold has been met indicating that an overload condition is imminent in the first network interface card. The illustrative embodiment delegates, by the first network interface card, the network data that caused the overload condition to be met to the second interface card in response to the first network interface card determining that a second threshold being met indicating that the overload condition has been met in the first network interface card.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
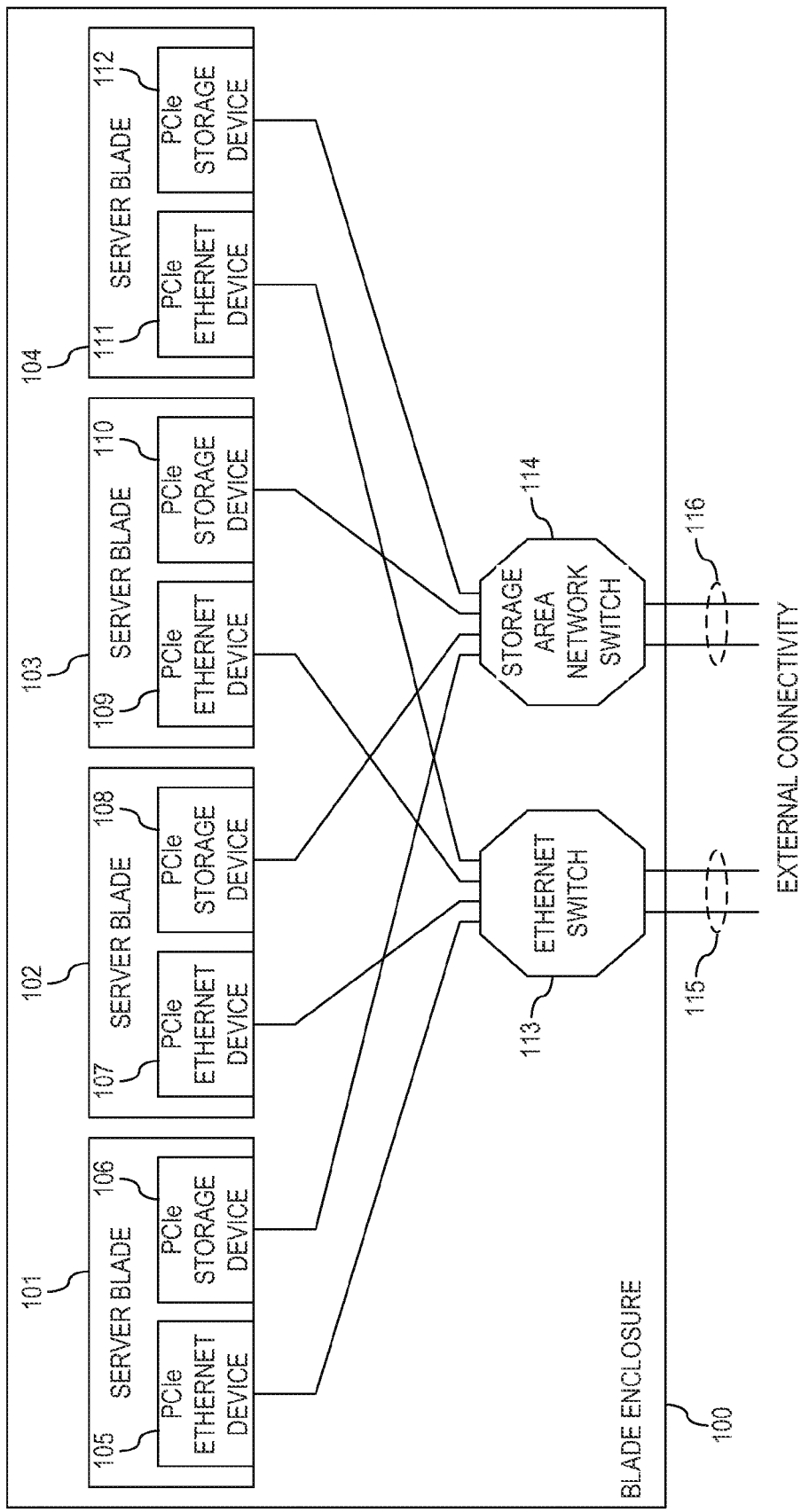
FIG. 1 is an exemplary diagram illustrating a system that incorporates a PCI Express (PCIe) bus in accordance with the PCIe specification.

Again, most modern computing devices make use of input/output (L/O) adapters and buses that utilize some version or implementation of the Peripheral Component Interconnect standard. FIG. 1 is an exemplary diagram illustrating a system that incorporates a PCI Express (PCIe) bus in accordance with the PCIe specification. The particular system shown in FIG. 1 is a blade enclosure in which a plurality of server blades 101-104 are provided. A server blade is a self-contained computer server designed for high density systems. Server blades have many components removed for space, power and other considerations while still having all the functionality components to be considered a computer. The blade enclosure 100 provides services, such as power, cooling, networking, various interconnects, and management of the various blades 101-104 in the blade enclosure 100. The blades 101-104 and the blade enclosure 100 together form a blade system.

As shown in FIG. 1, PCIe is implemented on each of the server blades 101-104 and is used to connect to one of the PCIe devices 105-112. Each of these server blades 101-104 is then plugged into a slot in the blade enclosure 100 which then connects the outputs of the PCIe Ethernet devices 105, 107, 109, and 111 to an Ethernet switch 113, via a backplane in the blade enclosure 100, which then generates Ethernet connections 115 for external connectivity, i.e. communication connections to devices outside the blade enclosure 100. Similarly, each of the PCIe storage devices 106, 108, 110, and 112 are connected via the backplane in the blade enclosure 100 to a storage area network switch 114 which then generates storage area network connections 116 for external connectivity.

Thus, the system shown in FIG. 1 is exemplary of one type of data processing system in which the PCI and/or PCIe specifications are implemented. Other configurations of data processing systems are known that use the PCI and/or PCIe specifications. These systems are varied in architecture and thus, a detailed treatment of each cannot be made herein. For more information regarding PCI and PCIe, reference is made to the PCI and PCIe specifications available from the peripheral component interconnect special interest group (PCI-SIG) website.

In addition to the PCI and PCIe specifications, the PCI-SIG has also defined input/output virtualization (IOV) standards for defining how to design an I/O adapter (IOA) which can be shared by several logical partitions (LPARs). A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

Figure 2:
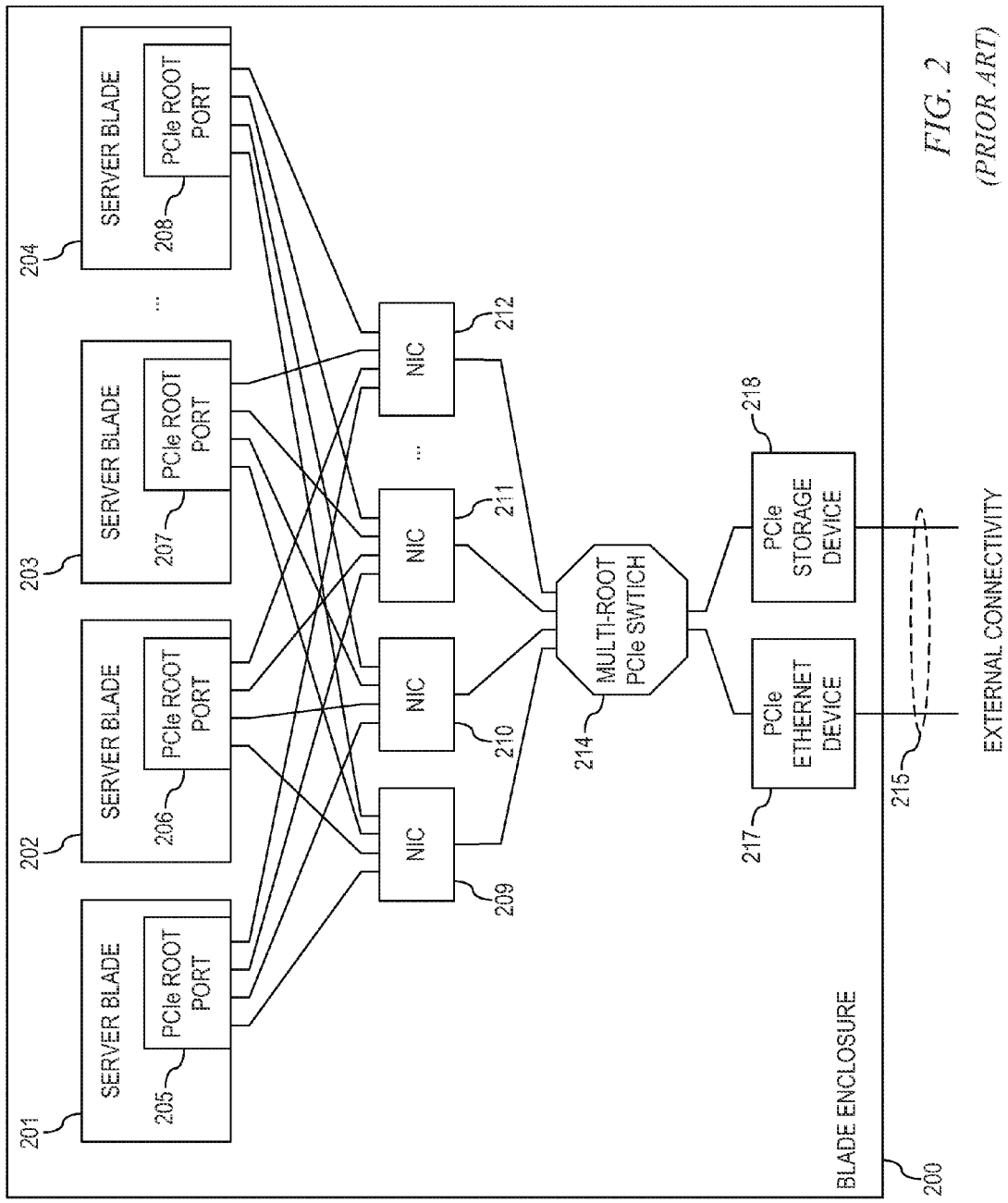
FIG. 2 is an exemplary diagram illustrating a system incorporating a PCI Express (PCIe) MR IOV.

Further, the PCI-SIG has also defined IOV standards for sharing IOAs between multiple systems. This capability is referred to as multi-root (MR) IOV. FIG. 2 is an exemplary diagram illustrating a system incorporating a PCI Express (PCIe) MR IOV. In particular, FIG. 2 illustrates how the architecture shown in FIG. 1 can be modified in order to share the PCIe devices across multiple systems. The server blades 201-204 now generate PCIe root ports 205-208 and drive PCIe connections across the blade enclosure 200 backplane, instead of incorporating the PCIe devices themselves on the sever blades 201-204 as was done with the server blades 101-104 in FIG. 1. The PCIe root ports 205-208 from each server blade 201-204 are then coupled, via one or more MR IOV-capable network interface cards (NICs) 209-212, to a multi-root (MR) PCIe switch 214, which is in turn connected to the PCIe devices 217 and 218. The PCIe devices 217 and 218 connect to the external Ethernet and storage devices through the external connectivity 215. Thus, PCIe devices can be used within the blade enclosure 200. This reduces overall costs in that the number of PCIe devices 217 and 218 may be minimized since they are shared across server blades 201-204. Moreover, this may reduce the complexity and cost of the server blades 201-204 themselves by not requiring integration of the PCIe devices 217 and 218.

Thus, as is illustrated in FIG. 2, client utilizing server blades 201-204 obtain external communication through MR IOV-capable network interface cards (NICs) 209-212. However, in current systems, such as that illustrated in FIG. 2, the MR IOV-capable NICs remain powered on all the time so that they are available to receive and transmit data, which is not power efficient. Further, since there is no direct support for load balancing among MR IOV NICs, current solutions attempt to resolve such issues through load balancing on device drivers or utilizing a Link Aggregation Control Protocol (LACP). However, such solutions do not account for the real physical NIC utilization because such solutions are not specific for MR IOV, and, thus, do not utilize the advantages of an MR IOV environment.

Thus, the illustrative embodiments provide for load balancing, network efficiency, and power savings in a multi-root input/output virtualization (MR IOV) environment. In operation, a current network interface card (NIC) delegates network data to a next NIC when the current NIC is overloaded with data that the current NIC is already processing. The next NIC in a set of successive NICs, which may be in a stand-by mode, is woken-up by an indication of the current NIC being overloaded and data about to be sent. That is, the next NIC, which may also be referred to as a slave NIC, stays in stand-by mode to save power and is woken up just prior to data being delegated. Those slave NICs enter the stand-by mode once no more data is delegated and current data has been processed. However, when all the NICs are overloaded, packets may be dropped, just as in current MR IOV environments.

Figure 3:
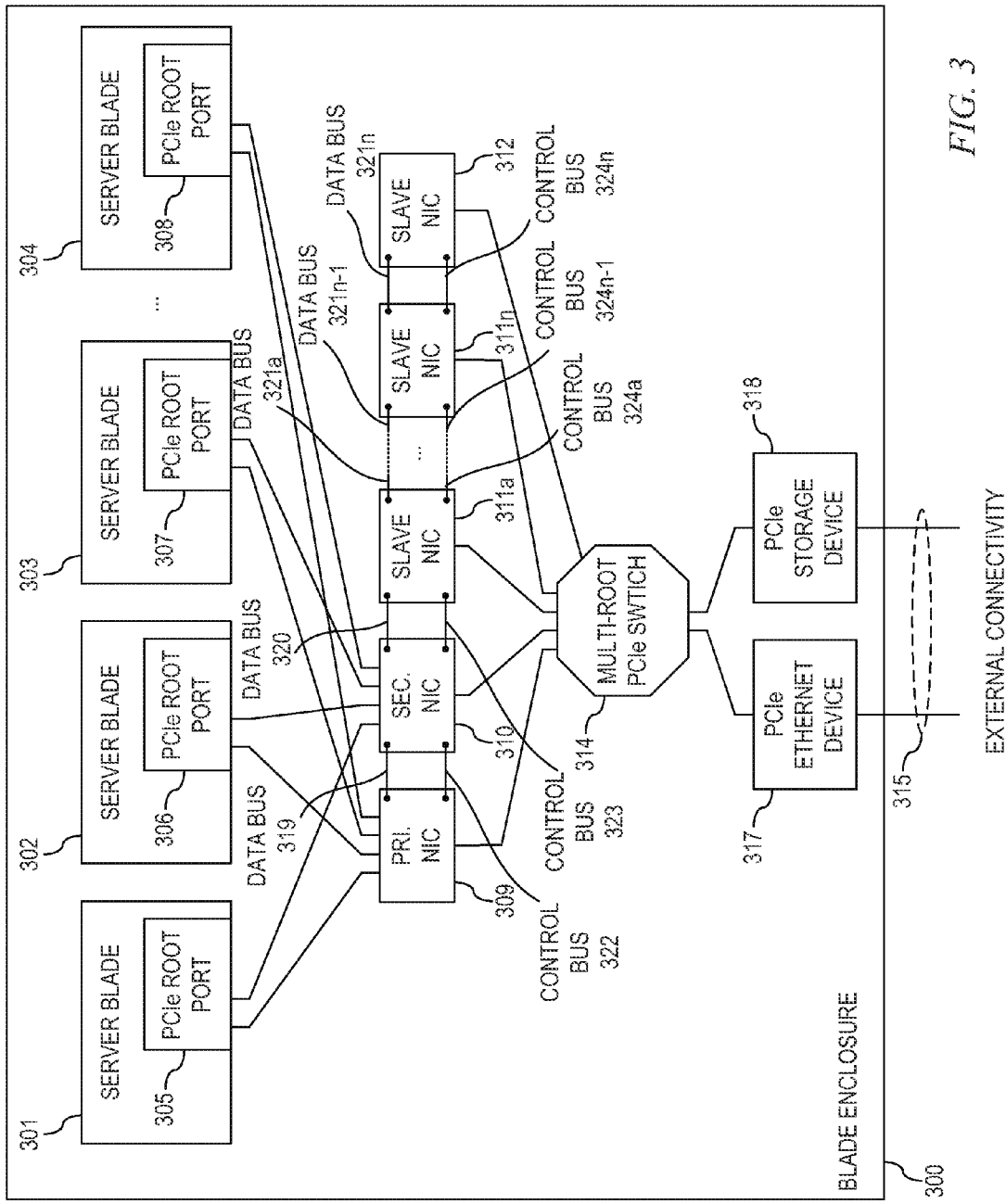
FIG. 3 depicts an exemplary diagram illustrating a PCI Express (PCIe) MR IOV environment with an improved network interface card configuration for load balancing, network efficiency, and power savings in accordance with an illustrative embodiment.

FIG. 3 depicts an exemplary diagram illustrating a PCI Express (PCIe) MR IOV environment with an improved network interface card configuration for load balancing, network efficiency, and power savings in accordance with an illustrative embodiment. Blade enclosure 300 is similar to blade enclosure 200 of FIG. 2 in that server blades 301-304 generate PCIe root ports 305-308 and drive PCIe connections across the blade enclosure 300 backplane. The PCIe root ports 305-308 from each server blade 301-304 are then coupled to a multi-root (MR) PCIe switch 314, which is in turn connected to the PCIe devices 317 and 318. The PCIe devices 317 and 318 connect to the external Ethernet and storage devices through the external connectivity 315. Thus, PCIe devices can be used within the blade enclosure 300.

However, in difference to blade enclosure 200 of FIG. 2, the PCIe root ports 305-308 from each server blade 301-304 are not directly coupled to each of MR IOV-capable network interface cards (NICs) 309, 310, 311a-311n, and 312. That is, PCIe root ports 305-308 are only directly coupled to primary NIC 309 and secondary NIC 310, with primary NIC 309 and secondary NIC 310 then being coupled to each other via data bus 319 and control bus 322, secondary NIC 310 being coupled to slave NIC 311a via data bus 320 and control bus 323, slave NIC 311a though 311n-1 being coupled to data buses 321a though 321n-1 and control buses 324a through 324n-1, respectively, and slave NIC 311n being coupled to slave NIC 312 via data bus 321n and control bus 324n. Within blade enclosure 300, only primary NIC 309 and secondary NIC 310 stay powered-on all the time so that primary NIC 309 may receive data from PCIe root ports 305-308 and secondary NIC 310 may provide load balancing and redundancy to primary NIC 309 in case of a failure of primary NIC 309. Slave NICs 311 and 312 are in a stand-by state, which utilizes only minimal power.

In operation, as long as primary NIC 309 is not experiencing a failure, primary NIC 309 receives data traffic from PCIe root ports 305-308 until an overflow condition is reached. However, just prior to the overload condition being reached, primary NIC 309 determines whether a first threshold has been reached that indicates that an overload condition is imminent. If primary NIC 309 determines that the first threshold has been met, then primary NIC 309 sends a resume signal via control bus 322 to secondary NIC 310. Since secondary NIC 310 is set to always powered-on, secondary NIC 310 ignores a power-up sequence associated with the resume signal but readies itself to receive data from primary NIC 309. When primary NIC 309 reaches a second threshold associated with the overload condition, primary NIC 309 delegates the data causing the overload condition to secondary NIC 310 via data bus 319. Therefore, secondary NIC 310 only processes data delegated by primary NIC 309.

Similar to the operation performed by primary NIC 309, secondary NIC 310 receives and processes data traffic from primary NIC 309 until a first threshold has been reached indicating that an overload condition is imminent. If secondary NIC 310 determines that the first threshold has been met, then secondary NIC 310 sends a resume signal via control bus 323 to slave NIC 311a. Since slave NIC 311a is in a powered-down state, slave NIC 311a performs a power-up sequence associated with the resume signal and readies itself to receive data from secondary NIC 310. When secondary NIC 310 reaches a second threshold associated with the overload condition, secondary NIC 310 delegates the data causing the overload condition to slave NIC 311a via data bus 320. Therefore, slave NIC 311a only process data delegated by secondary NIC 310.

Each slave NIC performs a similar process to that performed between secondary NIC 310 and slave NIC 311a except for the last slave NIC 312. That is, last slave NIC 312 powers up in response to receiving a resume signal from the slave NIC 311n via control bus 324n. However, last slave NIC 312 has no other NIC to delegate data to. Therefore, once last slave NIC 312 reaches the overload condition, last slave NIC 312 drops any data that cannot be processed. Last slave NIC 312 also generates an error code informing a system administrator about the dropped data event.

As incoming data from PCIe root ports 305-308 diminishes, primary NIC 309 may determine that the second threshold is no longer being exceeded. At this point, primary NIC 309 stops delegating data to secondary NIC 310. Then as primary NIC 309 determines that the first threshold is no longer being exceeded, primary NIC 309 sends a suspend signal to secondary NIC 310 via control bus 322. Even though secondary NIC 310 receives the suspend signal, since secondary NIC 310 is set to always powered-on, secondary NIC 310 ignores a power-down sequence associated with the suspend signal and continues to process any data that was previously delegated by primary NIC 309.

Similarly, since data is no longer being delegated by primary NIC 309, secondary NIC 310 may determine that its second threshold is no longer being exceeded. At this point, secondary NIC 310 stops delegating data to slave NIC 311a. Then, as secondary NIC 310 determines that its first threshold is no longer being exceeded, secondary NIC 310 sends a suspend signal to slave NIC 311a via control bus 323. Upon receiving the suspend signal, slave NIC 311a enters a suspend sequence, where slave NIC 311a determines, because secondary NIC 310 is no longer delegating data, that its second threshold is no longer being exceeded and stops delegating data to a next slave NIC. Slave NIC 311a then process all remaining data and, once all remaining data is processed, powers down and enters a stand-by state.

Each slave NIC performs a similar process to that performed by slave NIC 3111a including last slave NIC 312. That is, upon receiving a suspend signal from slave NIC 311n, last slave NIC 312 enters a suspend sequence, where last slave NIC 312 determines, because the preceding NIC is no longer delegating data, to process all remaining data and, once all remaining data is processed, powers down and enters a stand-by state.

While the description above illustrates NICs 309, 310, 311a-311n, and 312 being coupled together via individual ones of control buses and data buses, the illustrative embodiments recognize that NICs 309, 310, 311a-311n, and 312 may be coupled together utilizing one control bus and one data bus, such that control signals and data are transmitted between each of NICs 309, 310, 311a-311n, and 312 utilizing addressed packets, such that an individual NIC will only respond to control signals and data that is specifically addressed to that NIC. Thus, each of NICs 309, 310, 311a-311n, and 312 will reform data packets with an address of the NIC card that data is being delegated to.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
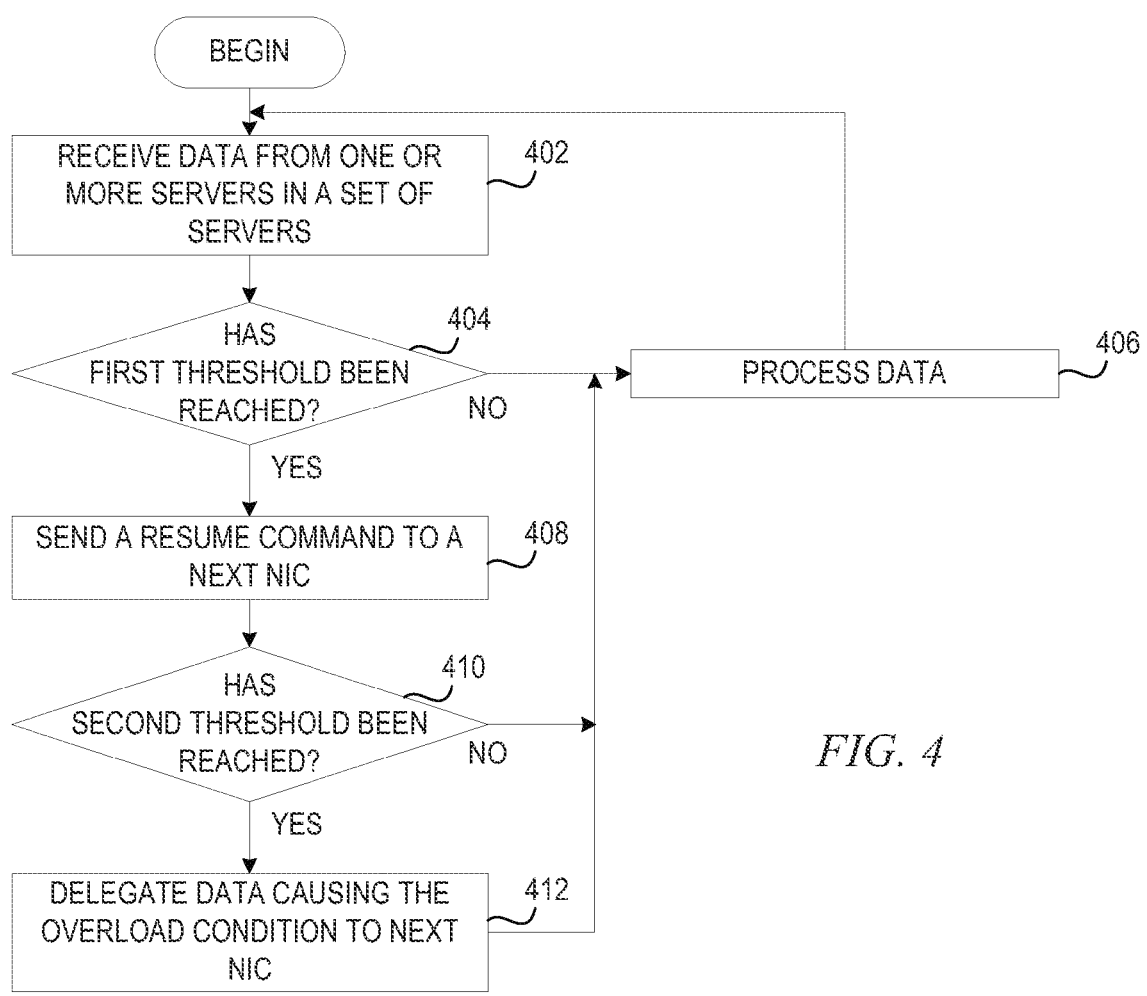
FIG. 4 depicts a flowchart of the operation performed by a primary (or redundant) network interface card (NIC) in activating other NICs and processing data in a multi-root input/output virtualization (MR IOV) environment in accordance with an illustrative embodiment.

FIG. 4 depicts a flowchart of the operation performed by a primary (or redundant) network interface card (NIC) in activating other NICs and processing data in a multi-root input/output virtualization (MR IOV) environment in accordance with an illustrative embodiment. As the operation begins, a primary NIC receives data from one or more servers in a set of servers (step 402). The primary NIC determines whether a first threshold indicating that an overload condition is imminent has been reached (step 404). If at step 404 the primary NIC determines that the first threshold has not been met, then the primary NIC processes the data (step 406), with the operation returning to step 402 thereafter. If at step 404 the primary NIC determines that the first threshold has been met, then the primary NIC sends a resume command to a next NIC via a control bus (step 408). The primary NIC then determines whether a second threshold has been met indicating an overload condition (step 410). If at step 410 the primary NIC determines that the second threshold has not been met, then the operation proceeds to step 406. If at step 410 the primary NIC determines that the second threshold has been met, then the primary NIC delegates the data causing the overload condition to the next NIC (step 412), with the operation returning to step 406 thereafter.

Figure 5:
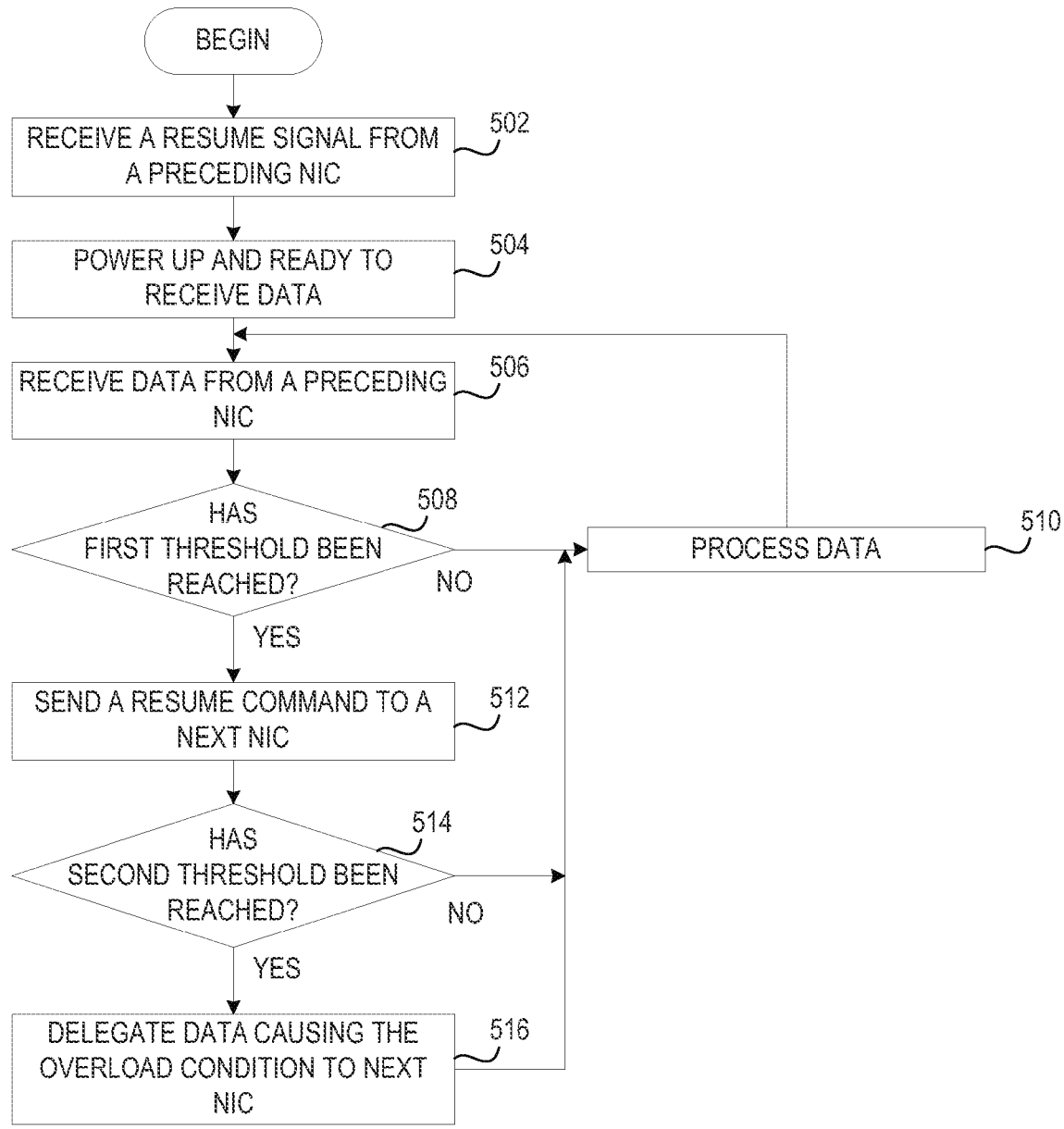
FIG. 5 depicts a flowchart of the operation performed by any network interface card (NIC), other than a primary (or redundant) or a last NIC, in activating other NICs and processing data in a multi-root input/output virtualization (MR IOV) environment in accordance with an illustrative embodiment.

FIG. 5 depicts a flowchart of the operation performed by any network interface card (NIC), other than a primary (or redundant) or a last NIC, in activating other NICs and processing data in a multi-root input/output virtualization (MR IOV) environment in accordance with an illustrative embodiment. As the operation begins, a NIC receives a resume signal from a preceding NIC (step 502). If not already powered up, the NIC powers up and readies itself to receive data (step 504). The NIC then receives data from a preceding NIC (step 506). The NIC determines whether a first threshold indicating that an overload condition is imminent has been reached (step 508). If at step 508 the NIC determines that the first threshold has not been met, then the NIC processes the data (step 510), with the operation returning to step 506 thereafter. If at step 508 the NIC determines that the first threshold has been met, then the NIC sends a resume command to a next NIC via a control bus (step 512). The NIC then determines whether a second threshold has been met indicating an overload condition (step 514). If at step 514 the NIC determines that the second threshold has not been met, then the operation proceeds to step 510. If at step 514 the NIC determines that the second threshold has been met, then the NIC delegates the data causing the overload condition to the next NIC (step 516), with the operation returning to step 510 thereafter.

Figure 6:
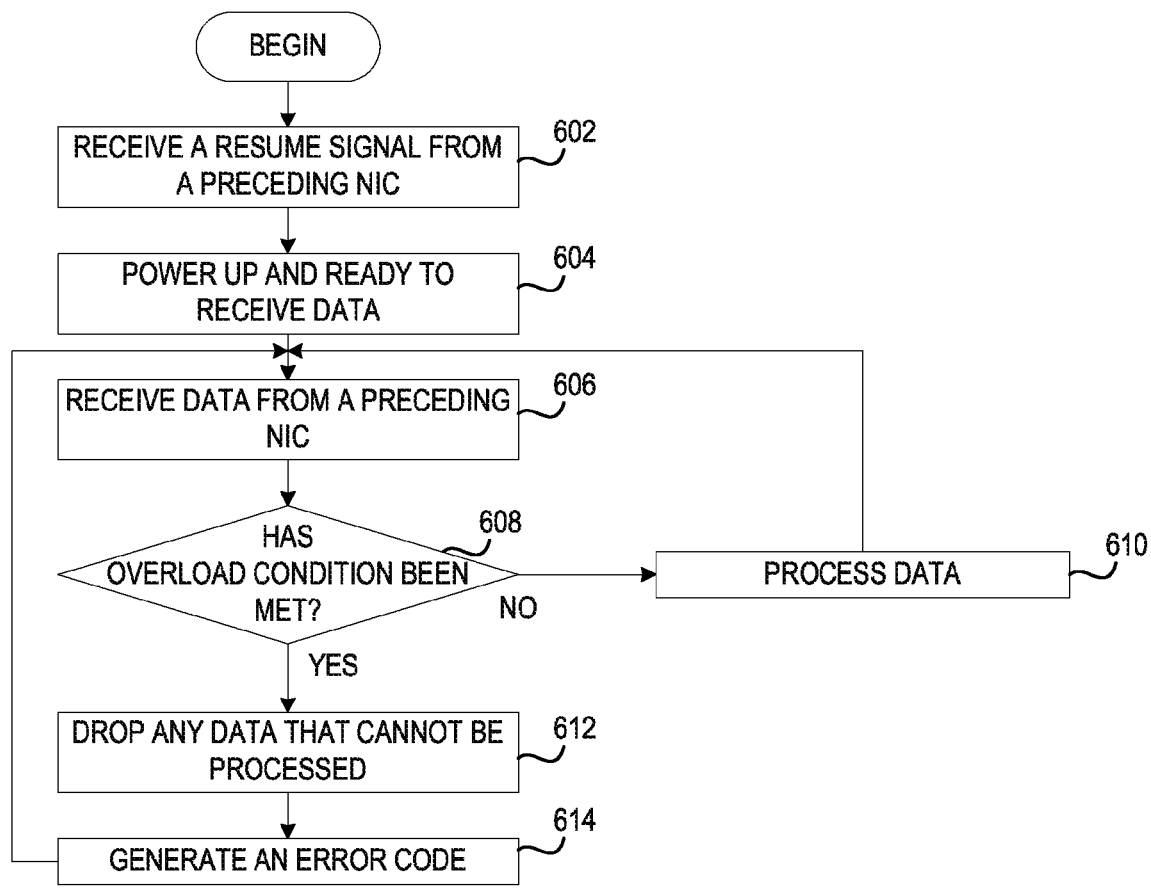
FIG. 6 depicts a flowchart of the operation performed by a last network interface card (NIC) in processing data in a multi-root input/output virtualization (MR IOV) environment in accordance with an illustrative embodiment.

FIG. 6 depicts a flowchart of the operation performed by a last network interface card (NIC) in processing data in a multi-root input/output virtualization (MR IOV) environment in accordance with an illustrative embodiment. As the operation begins, a last NIC receives a resume signal from a preceding NIC (step 602). If not already powered up, the last NIC powers up and readies itself to receive data (step 604). The NIC then receives data from a preceding NIC (step 606). The last NIC determines whether an overload condition has been reached (step 608). If at step 608 the last NIC determines that the overload condition has not been met, then the last NIC processes the data (step 610), with the operation returning to step 606 thereafter. If at step 608 the last NIC determines that the overload condition has been met, the last NIC drops any data that cannot be processed (step 612). The last NIC then generates an error code informing a system administrator about the dropped data event (step 614), with the operation returning to step 606 thereafter.

Figure 7:
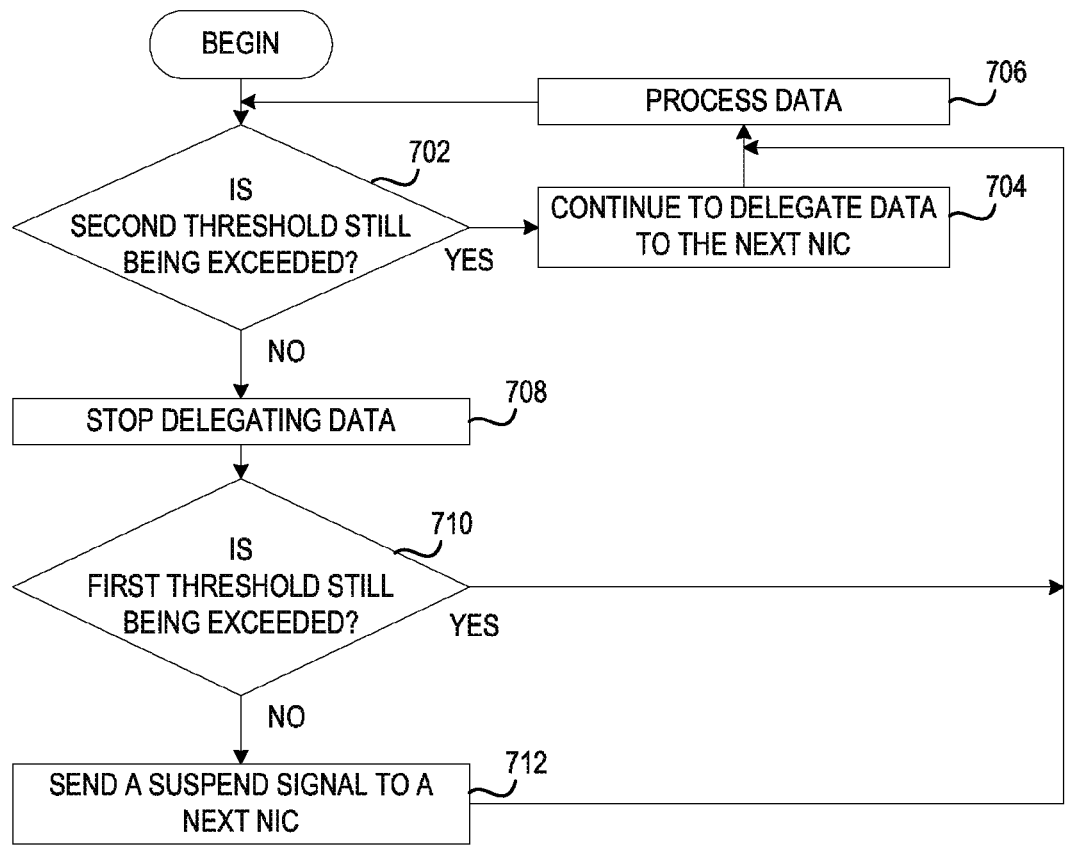
FIG. 7 depicts a flowchart of the operation performed by a primary (or redundant) network interface card (NIC) in deactivating other NICs in a multi-root input/output virtualization (MR IOV) environment in accordance with an illustrative embodiment.

FIG. 7 depicts a flowchart of the operation performed by a primary (or redundant) network interface card (NIC) in deactivating other NICs in a multi-root input/output virtualization (MR IOV) environment in accordance with an illustrative embodiment. As the operation begins, a primary NIC determines whether a second threshold that has already been exceeded is no longer being exceeded (step 702). If at step 702 the primary NIC determines that the second threshold is still being exceeded, then the primary NIC continues to delegate data to the next NIC (step 704) and continues to process data (step 706), with the operation returning to step 702. If at step 702 the primary NIC determines that the second threshold is no longer being exceeded, then the primary NIC stops delegating data to the next NIC (step 708). The primary NIC determines whether a first threshold that has already been exceeded is no longer being exceeded (step 710). If at step 710 the primary NIC determines that the first threshold is still being exceeded, then the operation proceeds to step 706. If at step 710 the primary NIC determines that the first threshold is no longer being exceeded, the primary NIC sends a suspend signal to the next NIC (step 712), with the operation proceeding to step 706 thereafter.

Figure 8:
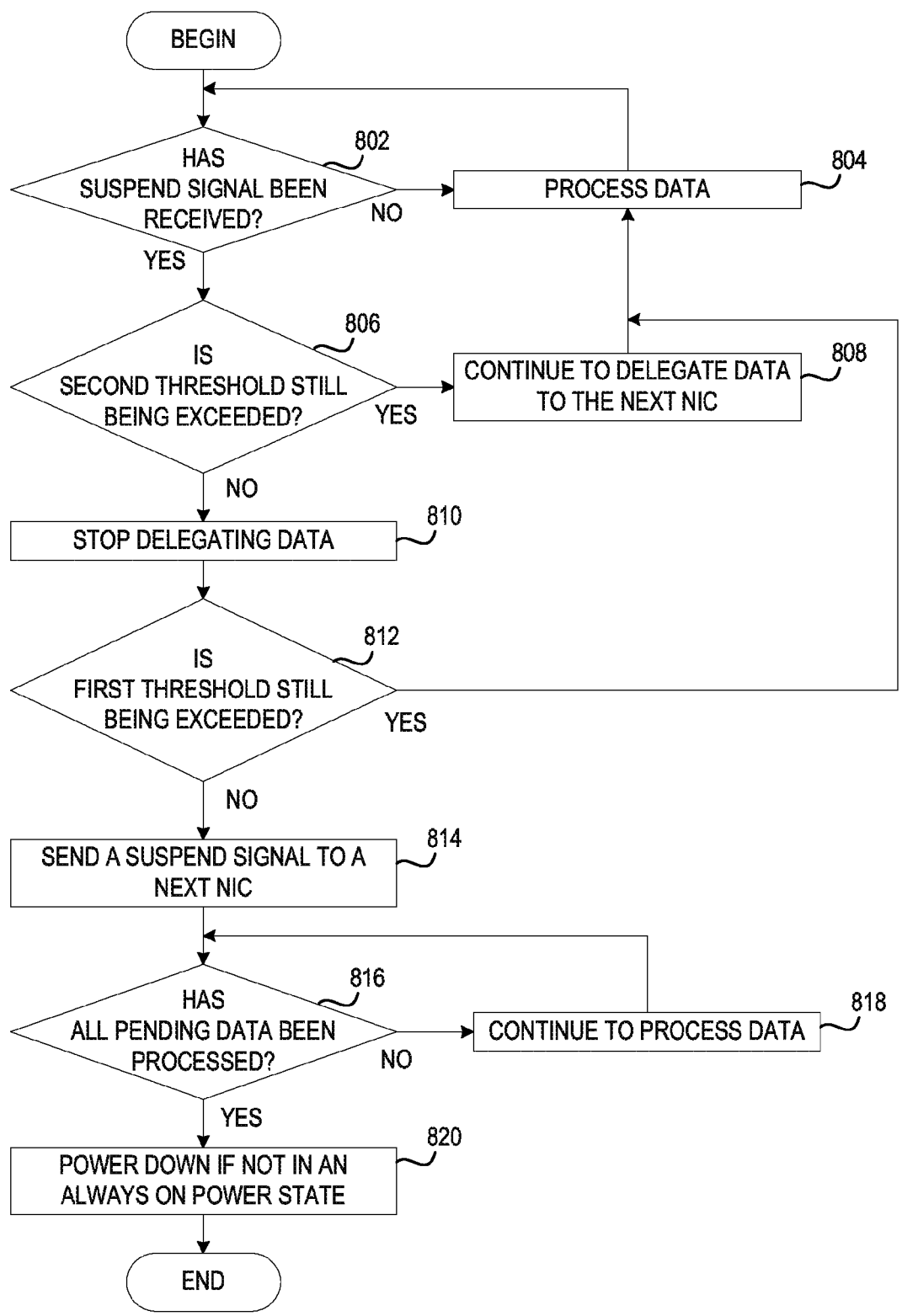
FIG. 8 depicts a flowchart of the operation performed by any network interface card (NIC), other than a primary (or redundant) or a last NIC, in deactivating other NICs in a multi-root input/output virtualization (MR IOV) environment in accordance with an illustrative embodiment.

FIG. 8 depicts a flowchart of the operation performed by any network interface card (NIC), other than a primary (or redundant) or a last NIC, in deactivating other NICs in a multi-root input/output virtualization (MR IOV) environment in accordance with an illustrative embodiment. As the operation begins, a NIC determines whether a suspend signal has been received (step 802). If at step 802 the NIC fails to receive a suspend signal, then the NIC continues to process data (step 804), with the operation returning to step 802 thereafter. If at step 802 the NIC receives a suspend signal, the NIC determines whether a second threshold that has already been exceeded is no longer being exceeded (step 806). If at step 806 the NIC determines that the second threshold is still being exceeded, then the primary NIC continues to delegate data to the next NIC (step 808), with the operation proceeding to step 804 thereafter. If at step 806 the NIC determines that the second threshold is no longer being exceeded, then the NIC stops delegating data to the next NIC (step 810). The NIC determines whether a first threshold that has already been exceeded is no longer being exceeded (step 812). If at step 812 the NIC determines that the first threshold is still being exceeded, then the operation proceeds to step 804. If at step 812 the NIC determines that the first threshold is no longer being exceeded, the NIC sends a suspend signal to the next NIC (step 814). The NIC then determines whether all pending data has been processed (step 816). If at step 816 all pending data has not been processed, then the NIC continues to process data (step 818), with the operation returning to step 816. If at step 816 all pending data has been processed, then the NIC powers down if the NIC is not in an always on power state (step 820), with the operation terminating.

Figure 9:
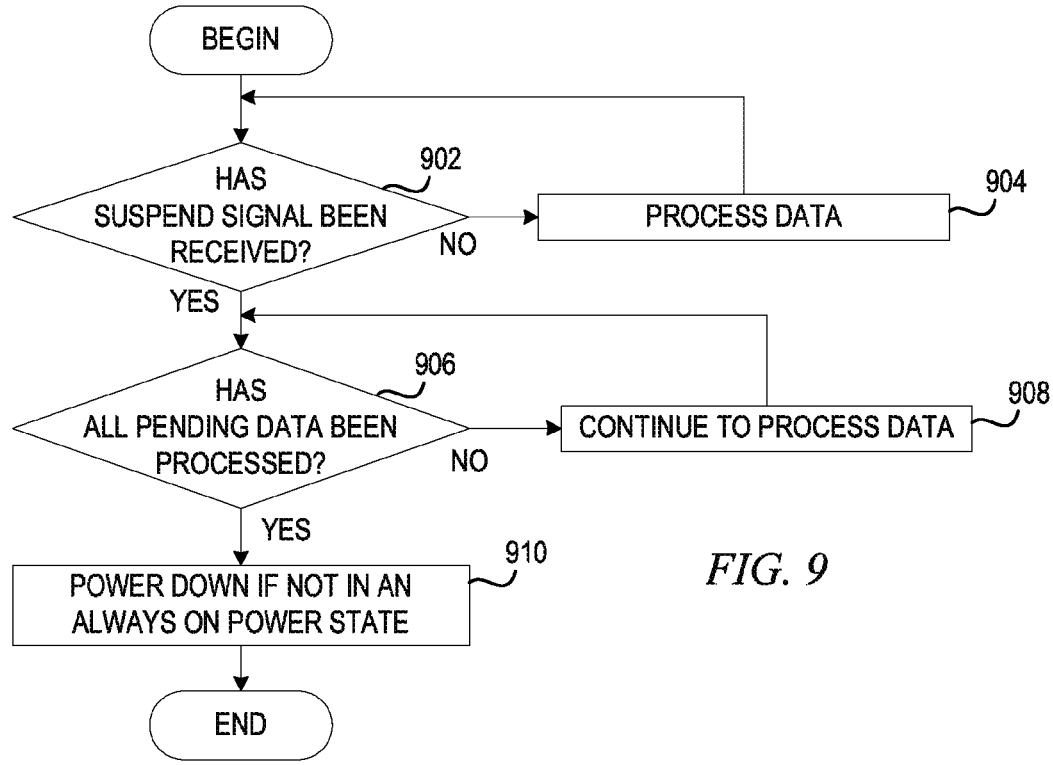
FIG. 9 depicts a flowchart of the operation performed by a last network interface card (NIC) in a multi-root input/output virtualization (MR IOV) environment in accordance with an illustrative embodiment.

FIG. 9 depicts a flowchart of the operation performed by a last network interface card (NIC) in a multi-root input/output virtualization (MR IOV) environment in accordance with an illustrative embodiment. As the operation begins, a last NIC determines whether a suspend signal has been received (step 902). If at step 902 the last NIC fails to receive a suspend signal, then the last NIC continues to process data (step 904), with the operation returning to step 902 thereafter. If at step 902 the last NIC receives a suspend signal, the last NIC determines whether all pending data has been processed (step 906). If at step 906 all pending data has not been processed, then the last NIC continues to process data (step 908), with the operation retuning to step 906. If at step 906 all pending data has been processed, then the last NIC powers down (step 910), with the operation terminating.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for load balancing network interface cards (NICs) within an MR IOV environment. By allowing slave NICs to be powered up and powered down as network traffic increases and decreases, a power savings is realized through the smarter utilization. Furthermore, improved network efficiency is obtained that avoids link congestion by utilizing link-aggregation and splitting the traffic among the NICs.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for resource management, the method comprising:

receiving, by a first network interface card in a set of network interface cards, network data from one or more servers in a set of servers;

responsive to the first network interface card determining that a first threshold has been met indicating that an overload condition is imminent in the first network interface card, sending, by the first network interface card, a resume signal to a second network interface card in the set of network interface cards, wherein the resume signal is sent by the first network interface card to the second network interface card on either a control bus that directly couples the first network interface card to the second network interface card or a control bus that couples all of the network interface cards in the set of network interface cards together; and responsive to the first network interface card determining that a second threshold has been met indicating that the overload condition has been met in the first network interface card, delegating, by the first network interface card, the network data that caused the overload condition to be met to the second network interface card.

2. The method of claim 1, further comprising:

responsive to the second network interface card determining that a first threshold has been met indicating that an overload condition is imminent in the second network interface card, sending, by the second network interface card, a resume signal to a next network interface card in the set of network interface cards; and responsive to the second network interface card determining that a second threshold has been met indicating that the overload condition has been met in the second network interface card, delegating, by the second network interface card, the network data that caused the overload condition to be met to the next network interface card.

3. The method of claim 2, further comprising:
responsive to a last network interface card determining that an overload condition has been met in the last network interface card, dropping, by the last network interface card, the network data that caused the overload condition to be met; and
generating, by the last network interface card, an error code indicating that the network data has been dropped.

4. The method of claim 1, wherein, responsive to the resume signal being sent on the control bus that couples all of the network interface cards in the set of network interface cards together, the second network interface card recognizes that the resume signal is intended for the second network interface card based on an address associated with the resume signal matching the address of the second network interface card.

5. The method of claim 1, wherein the network data is sent by the first network interface card to the second network interface card on a data bus that directly couples the first network interface card to the second network interface card.

6. The method of claim 1, wherein the network data is sent by the first network interface card to the second network interface card on a data bus that couples all of the network interface cards in the set of network interface cards together and wherein the second network interface card recognizes that the resume signal is intended for the second network interface card based on an address associated with the network data matching the address of the second network interface card.

7. The method of claim 1, further comprising:
responsive to the first network interface card determining that the second threshold is no longer being met in the first network interface card, ceasing, by the first network interface card, delegation of the network data to the second network interface card; and
responsive to the first network interface card determining that the first threshold is no longer being met in the first network interface card, sending, by the first network interface card, a suspend signal to the second network interface card.

8. The method of claim 7, further comprising:
responsive to the second network interface card receiving the suspend signal to the second network interface card and determining that the second threshold is no longer being met in the second network interface card, ceasing, by the first network interface card, delegation of the network data to a next network interface card;
responsive to the second network interface card determining that the first threshold is no longer being met in the second network interface card, sending, by the second network interface card, a suspend signal to the next network interface card;
responsive to determining that a state of the second network interface card is an always powered-on state,
processing, by the second network interface card, all network data received by the second network interface card; and
ignoring, by the second network interface card, the suspend signal to the second network interface card; and responsive to determining that a state of the second network interface card fails to be the always powered-on state:
processing, by the second network interface card, all network data received by the second network interface card; and
entering, by the second network interface card, a stand-by mode.

9. The method of claim 8, further comprising:
responsive to a last network interface card receiving a suspend signal to the last network interface card, determining that an overload condition is no longer being met in the last network interface card:
processing, by the last network interface card, all network data received by the last network interface card; and
entering, by the last network interface card, a stand-by mode.

10. A computer program product comprising a non-transitory computer readable storage medium having a computer readable program stored therein, wherein the computer readable program, when executed on a computing device, causes the computing device to:
receive, by a first network interface card in a set of network interface cards, network data from one or more servers in a set of servers;
responsive to the first network interface card determining that a first threshold has been met indicating that an overload condition is imminent in the first network interface card, send, by the first network interface card, a resume signal to a second network interface card in the set of network interface cards, wherein the resume signal is sent by the first network interface card to the second network interface card on either a control bus that directly couples the first network interface card to the second network interface card or a control bus that couples all of the network interface cards in the set of network interface cards together; and
responsive to the first network interface card determining that a second threshold has been met indicating that the overload condition has been met in the first network interface card, delegate, by the first network interface card, the network data that caused the overload condition to be met to the second network interface card.

11. The computer program product of claim 10, wherein the computer readable program further causes the computing device to:
responsive to the second network interface card determining that a first threshold has been met indicating that an overload condition is imminent in the second network interface card, send, by the second network interface card, a resume signal to a next network interface card in the set of network interface cards; and
responsive to the second network interface card determining that a second threshold has been met indicating that the overload condition has been met in the second network interface card, delegate, by the second network interface card, the network data that caused the overload condition to be met to the next interface card.

12. The computer program product of claim 11, wherein the computer readable program further causes the computing device to:
responsive to a last network interface card determining that an overload condition has been met in the last network interface card, drop, by the last network interface card, the network data that caused the overload condition to be met; and generate, by the last network interface card, an error code indicating that the network data has been dropped.

13. The computer program product of claim 10, wherein, responsive to the resume signal being sent on the control bus that couples all of the network interface cards in the set of network interface cards together, the second network interface card recognizes that the resume signal is intended for the second network interface card based on an address associated with the resume signal matching the address of the second network interface card.

14. The computer program product of claim 10, wherein the network data is sent by the first network interface card to the second network interface card on a data bus that directly couples the first network interface card to the second network interface card.

15. The computer program product of claim 10, wherein the network data is sent by the first network interface card to the second network interface card on a data bus that couples all of the network interface cards in the set of network interface cards together and wherein the second network interface card recognizes that the resume signal is intended for the second network interface card based on an address associated with the network data matching the address of the second network interface card.

16. The computer program product of claim 10, wherein the computer readable program further causes the computing device to:
responsive to the first network interface card determining that the second threshold is no longer being met in the first network interface card, cease, by the first network interface card, delegation of the network data to the second network interface card; and
responsive to the first network interface card determining that the first threshold is no longer being met in the first network interface card, send, by the first network interface card, a suspend signal to the second network interface card.

17. An apparatus, comprising:
a processor; and
a memory coupled to the processor, wherein the memory comprises instructions which, when executed by the processor, cause the processor to:
receive, by a first network interface card in a set of network interface cards, network data from one or more servers in a set of servers;
responsive to the first network interface card determining that a first threshold has been met indicating that an overload condition is imminent in the first network interface card, send, by the first network interface card, a resume signal to a second network interface card in the set of network interface cards, wherein the resume signal is sent by the first network interface card to the second network interface card on either a control bus that directly couples the first network interface card to the second network interface card or a control bus that couples all of the network interface cards in the set of network interface cards together; and
responsive to the first network interface card determining that a second threshold has been met indicating that the overload condition has been met in the first network interface card, delegate, by the first network interface card, the network data that caused the overload condition to be met to the second network interface card.

18. The apparatus of claim 17, wherein the computer readable program further causes the computing device to:
responsive to the second network interface card determining that a first threshold has been met indicating that an overload condition is imminent in the second network interface card, send, by the second network interface card, a resume signal to a next network interface card in the set of network interface cards;
responsive to the second network interface card determining that a second threshold has been met indicating that the overload condition has been met in the second network interface card, delegate, by the second network interface card, the network data that caused the overload condition to be met to the next network interface card;
responsive to a last network interface card determining that an overload condition has been met in the last network interface card, drop, by the last network interface card, the network data that caused the overload condition to be met; and
generate, by the last network interface card, an error code indicating that the network data has been dropped.

19. The apparatus of claim 17, wherein, responsive to the resume signal being sent on the control bus that couples all of the network interface cards in the set of network interface cards together, the second network interface card recognizes that the resume signal is intended for the second network interface card based on an address associated with the resume signal matching the address of the second network interface card.

20. The apparatus of claim 17, wherein the network data is sent by the first network interface card to the second network interface card on a data bus that directly couples the first network interface card to the second network interface card.

21. The apparatus of claim 17, wherein the network data is sent by the first network interface card to the second network interface card on a data bus that couples all of the network interface cards in the set of network interface cards together and wherein the second network interface card recognizes that the resume signal is intended for the second network interface card based on an address associated with the network data matching the address of the second network interface card.

22. The apparatus of claim 17, wherein the instructions further cause the processor to:
responsive to the first network interface card determining that the second threshold is no longer being met in the first network interface card, cease, by the first network interface card, delegation of the network data to the second network interface card; and
responsive to the first network interface card determining that the first threshold is no longer being met in the first network interface card, send, by the first network interface card, a suspend signal to the second network interface card.

* * * * *